Patented Mar. 5, 1929.

1,703,922

UNITED STATES PATENT OFFICE.

JÜRGEN CALLSEN, OF ELBERFELD, GERMANY, ASSIGNOR TO WINTHROP CHEMICAL COMPANY, INC., OF NEW YORK, N. Y.

COMPOUND FROM TRICHLOROBUTYLALCOHOL AND 4-DIMETHYLAMINO-1-PHENYL-2.3-DIMETHYL-5-PYRAZOLONE.

No Drawing. Original application filed January 30, 1926, Serial No. 85,052, and in Germany April 23, 1925. Divided and this application filed July 22, 1926. Serial No. 124,299.

The present invention which is a division of Ser. No. 85,052 filed on January 30, 1926, relates to a homogeneous compound which is obtainable from 2.2.3-tri-chlorobutyl alcohol and 1-phenyl-2.3-dimethyl-4-dimethylamino-5-pyrazolone by causing these components to interact with each other in molecular quantities. The reaction may take place, for example, by melting the components together or by mixing their solutions and evaporating and allowing the same to crystallize. In this manner crystalline compounds are obtained, which can be recrystallized without decomposition for example, from ligroin, giving crystals which possess a sharp melting point. The new products have proved themselves to be valuable analgetica.

The following example will serve to illustrate my invention:—

*Example*—177 parts by weight of 2.2.3-trichlorbutyl alcohol and 231 parts by weight of 4-dimethylamino-1-phenyl-2.3-dimethylpyrazolone are melted together on a steam bath. On cooling the melt solidifies to a hard crystal mass, which may be either ground or recrystallized from hot ligroin. A practically colourless crystalline powder is thus obtained, which is easily soluble in alcohol, acetone, benzene, less easily soluble in cold ligroin and soluble with difficulty in petrol ether. The new compound possesses a melting point of 61° to 63° C. and has probably the following formula:

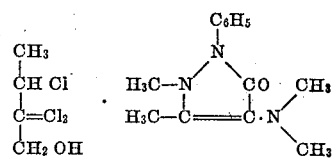

I claim:

As a new product the compound of the probable formula:

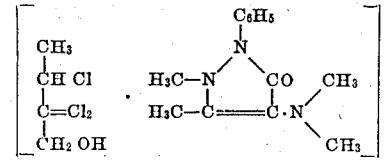

being an almost colourless crystalline powder, easily soluble in acetone, alcohol and benzol, less easily soluble in ligroin having the melting point 61–63° C. and being a valuable analgeticum substantially as described.

In testimony whereof I have hereunto set my hand.

JÜRGEN CALLSEN.